(12) United States Patent
Naito

(10) Patent No.: US 8,718,247 B2
(45) Date of Patent: May 6, 2014

(54) IMAGE PROCESSING APPARATUS, METHOD FOR CONTROLLING THE SAME, AND STORAGE MEDIUM

(75) Inventor: Yosui Naito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/464,039

(22) Filed: May 4, 2012

(65) Prior Publication Data

US 2012/0288076 A1 Nov. 15, 2012

(30) Foreign Application Priority Data

May 11, 2011 (JP) ................................. 2011-106624

(51) Int. Cl.
*H04M 11/00* (2006.01)

(52) U.S. Cl.
USPC .................................................. 379/100.01

(58) Field of Classification Search
USPC ................. 379/100.01, 142.07; 358/406, 438
See application file for complete search history.

(56) References Cited

U.S. PATENT DOCUMENTS

| 5,815,285 A * | 9/1998 | Monty et al. ................... 358/442 |
| 6,137,830 A * | 10/2000 | Schneider et al. ............ 375/224 |
| 7,355,758 B2 * | 4/2008 | Desai ............................ 358/400 |
| 2002/0076034 A1 * | 6/2002 | Prabhu et al. ............ 379/390.02 |

FOREIGN PATENT DOCUMENTS

JP 10210113 A 8/1998

* cited by examiner

*Primary Examiner* — Joseph J Nguyen
(74) *Attorney, Agent, or Firm* — Rossi, Kimms & McDowell LLP

(57) ABSTRACT

An image processing apparatus that covers standards of a dial tone for a plurality of countries with a relatively small number of pattern tables and reduces the number of times that a sound is misdetected as a dial tone, a method for controlling the same and a program are provided. To accomplish this, the image processing apparatus measures a length of a tone signal received from outside; determines whether an intermittent dial tone including the measured tone signal and a previously received tone signal has a specific pattern or not; and determines whether a duty cycle of the intermittent dial tone is a duty cycle within a given range or not, thereby determining whether the dial tone is valid or not.

9 Claims, 4 Drawing Sheets

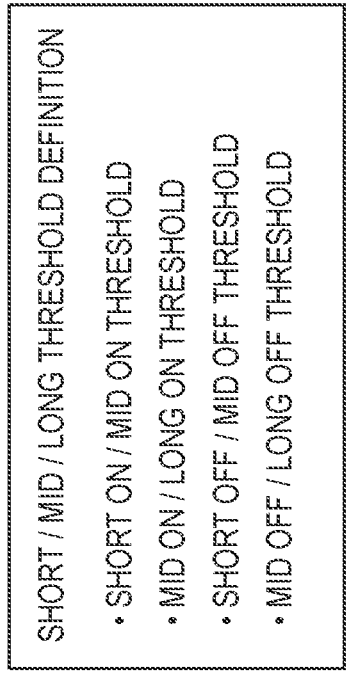

FIG. 4B

SHORT / MID / LONG THRESHOLD DEFINITION
- SHORT ON / MID ON THRESHOLD
- MID ON / LONG ON THRESHOLD
- SHORT OFF / MID OFF THRESHOLD
- MID OFF / LONG OFF THRESHOLD

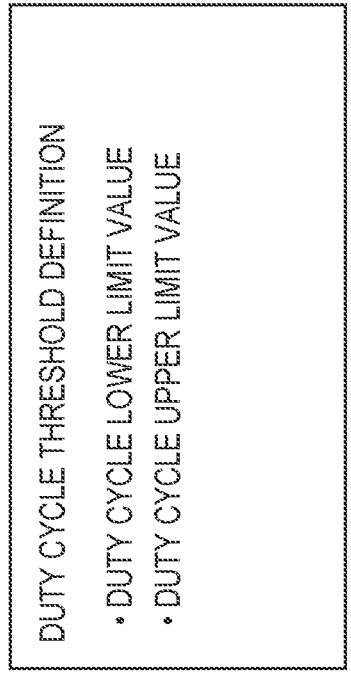

FIG. 4C

DUTY CYCLE THRESHOLD DEFINITION
- DUTY CYCLE LOWER LIMIT VALUE
- DUTY CYCLE UPPER LIMIT VALUE

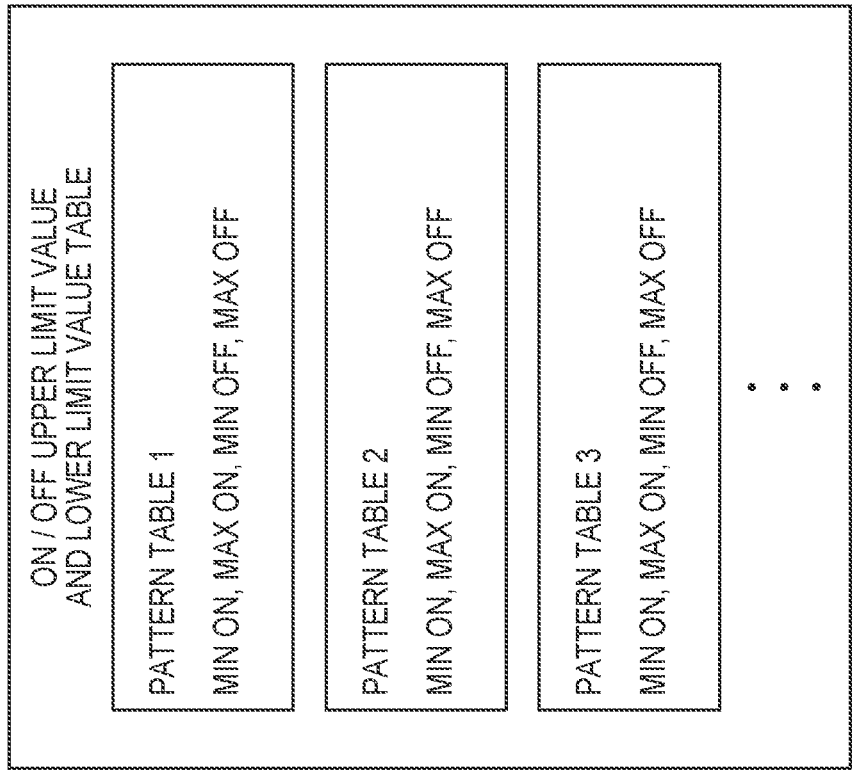

FIG. 4A

ON / OFF UPPER LIMIT VALUE
AND LOWER LIMIT VALUE TABLE

PATTERN TABLE 1
MIN ON, MAX ON, MIN OFF, MAX OFF

PATTERN TABLE 2
MIN ON, MAX ON, MIN OFF, MAX OFF

PATTERN TABLE 3
MIN ON, MAX ON, MIN OFF, MAX OFF

...

IMAGE PROCESSING APPARATUS, METHOD FOR CONTROLLING THE SAME, AND STORAGE MEDIUM

BACKGROUND OF THE INVENTION

1. Field of the Invention

The present invention relates to an image processing apparatus, a method for controlling the same, and a storage medium.

2. Description of the Related Art

When transmission of a fax document coincides with the reception of a phone call from a third party (coinciding of an outgoing call and an incoming call), a line can be erroneously connected in some cases. If the third party has a function of switching to a fax reception mode upon receiving a FAX calling signal (CNG), the fax document may end up being sent to the third party. To prevent such an erroneous transmission, there is a method in which a dial tone incoming from a switch is monitored at the time of calling and unless the dial tone is detected, the calling (transmission) is not carried out.

Standards for dial tones vary between countries. Frequencies and cadence patterns, which define the On-time and Off-time of the dial tone, vary from country to country. In order to prevent erroneous transmission of a fax document as described above, it is necessary to correctly detect dial tones having differing patterns in different countries. Furthermore, when an outgoing call and an incoming call collide, a sound may be audible from the line, so it is also very important not to misdetect such a sound as the dial tone.

To make a cadence check of a tone signal, Japanese Patent Laid-Open No. 10-210113 proposes preparing a pattern table that specifies an upper limit value and a lower limit value for each of the On-time and the Off-time country by country. Based on the upper limit and lower limit values in the table, it is determined whether the On-time and Off-time of a received tone signal are within the respective ranges.

However, the conventional technology has the problems given below. Generally speaking, from the viewpoint of program maintenance, it is preferable that the pattern table prepared is small. In the method of the conventional technology described above, to have standards of a plurality of countries covered with one pattern table, the upper limit and lower limit values of the ON-time and OFF-time need to be expanded. With the expanded upper limit and lower limit values of ON-time and OFF-time, it is possible to detect any cadence of the received dial tone to some extent.

On the other hand, that increases the possibility of misdetection when the sound is received. Some of the sounds include the same frequency as that of the dial tone, and thus receiving the sound causes a filter for detecting the dial tone intermittently to be turned ON/OFF. With the expanded upper limit and lower limit values of On-time and Off-time, there is an increased possibility that the ON/OFF happens to be within the valid range even when the sound is received and as a result, a misdetection occurs. In that case, even though there is no dial tone, the misdetection allows the call to go out, leading to erroneous transmission of a fax document.

SUMMARY OF THE INVENTION

The present invention enables realization of an image processing apparatus that covers standards of a dial tone for a plurality of countries with a relatively small number of pattern tables and reduces the number of misdetections of a sound as the dial tone, as well as a method for controlling the same and a storage medium.

One aspect of the present invention provides an image processing apparatus comprising: a signal determination unit that determines whether a received signal received from outside is a tone signal; a measurement unit that measures a length of the tone signal, if the signal determination unit determines that the received signal is a tone signal; a pattern determination unit that determines whether an intermittent dial tone has a specific pattern or not, the intermittent dial tone including the tone signal whose length is measured by the measurement unit and a previously received tone signal; a duty cycle determination unit that determines whether a duty cycle of the intermittent dial tone is a duty cycle within a given range, if the pattern determination unit determines that the intermittent dial tone has the specific pattern; and a calling unit that performs calling in accordance with the intermittent dial tone, if the duty cycle determination unit determines that the duty cycle of the intermittent dial tone is a duty cycle within the given range.

Another aspect of the present invention provides a method for controlling an image processing apparatus comprising: determining, with a signal determination unit, whether a received signal received from outside is a tone signal; measuring, with a measurement unit, a length of the tone signal, if the received signal is determined in the signal determining step to be a tone signal; determining, with a pattern determination unit, whether an intermittent dial tone has a specific pattern, the intermittent dial tone including the tone signal whose length is measured in the measuring step and a previously received tone signal; determining, with a duty cycle determination unit, whether a duty cycle of the intermittent dial tone is a duty cycle within a given range, if the intermittent dial is determined in the pattern determining step to have the specific pattern; and calling in accordance with the intermittent dial tone with a calling unit, if the duty cycle of the intermittent dial tone is determined in the duty cycle determining step to be a duty cycle within the given range.

Yet another aspect of the present invention provides a non-transitory computer-readable storage medium storing a computer program that causes a computer to execute each step in the method for controlling the image processing apparatus.

Further features of the present invention will be apparent from the following description of exemplary embodiments with reference to the attached drawings.

BRIEF DESCRIPTION OF THE DRAWINGS

FIGS. 4A to 4C are diagrams showing a valid upper and lower limit value ON/OFF table and a diagram showing S/M/L threshold definitions of an intermittent dial tone in accordance with the present embodiment.

DESCRIPTION OF THE EMBODIMENTS

Figure 1:
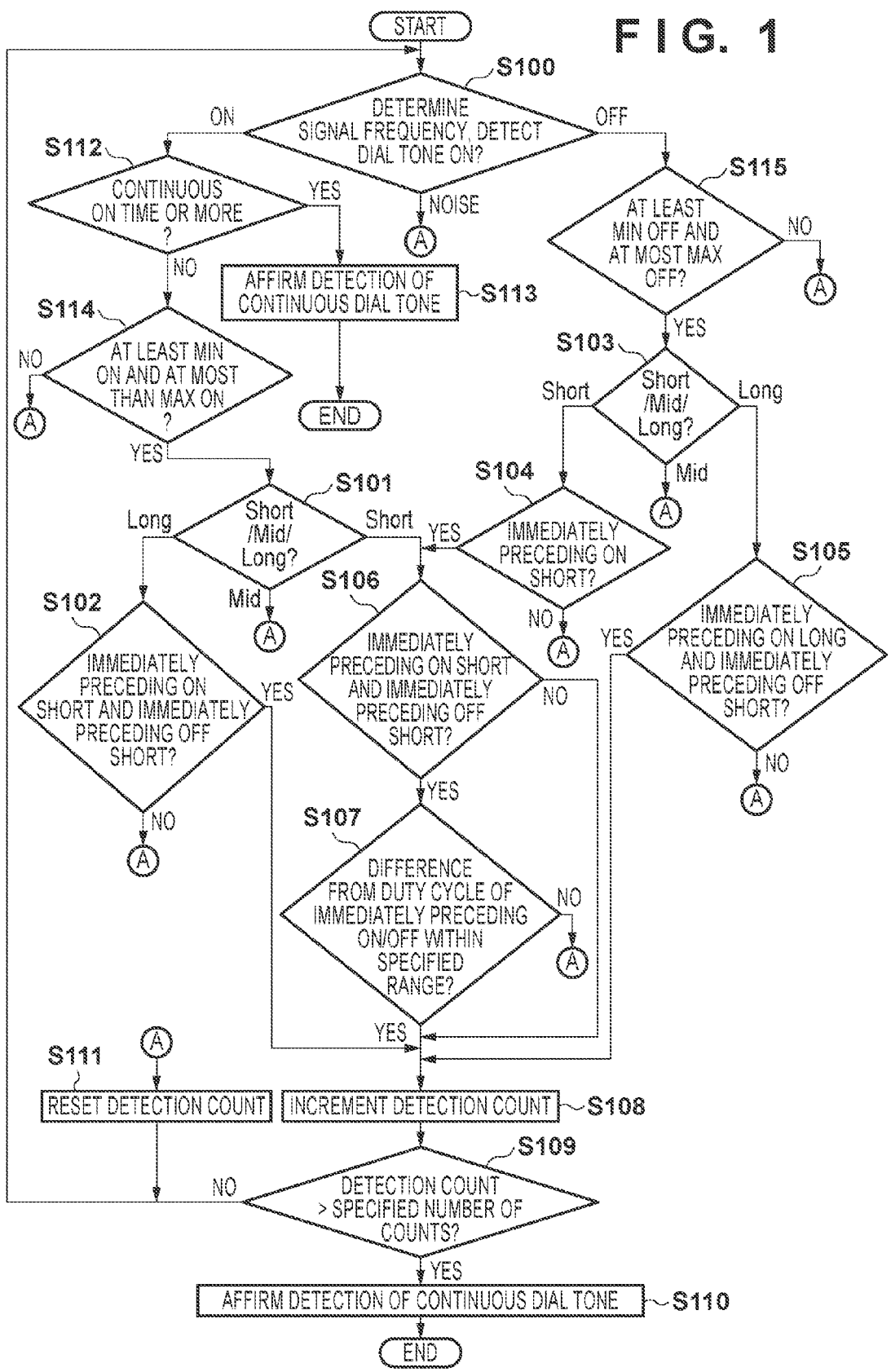
FIG. 1 is a flowchart showing a processing flow in accordance with an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of Image Processing Apparatus>

With reference to FIGS. 1 to 5, embodiments of the present invention will be described below. First, with reference to FIG. 5, a configuration example of an image processing apparatus is described. Numeral 500 denotes an image processing apparatus. The image processing apparatus 500 includes an operation unit 501, a reading unit 502, a system control unit 503, various sensors 505, a recording unit 506, a modem/NCU (Network Control Unit) 507, and a power source 508. The system control unit 503 includes a CCU (Communication Control Unit) 504.

The operation unit 501 comprises a keyboard, a display unit and the like and is for letting an operator perform various input operations. It should be noted that the operation unit 501 may include a touch panel type display unit to realize software buttons. The reading unit 502 encodes image data to be processed by the image processing apparatus. The system control unit 503 controls the overall apparatus. The CCU 504 is a communication control unit that performs modem control, NCU control, protocol control and contraction and expansion of images.

The various sensors 505 include a document size detection sensor or the like and the detection results of each sensor are conveyed to the system control unit 503. The recording unit 506 records a received image or data file on a paper medium. The modem/NCU 507 demodulates a modulated signal from a line or conversely, modulates a signal from the apparatus to transmit it over the line. Furthermore, the modem/NCU 507, which corresponds to an interface between a telephone line and a fax machine, performs line control by detecting a signal received from a telephone line and transmitting it to the modem and switching the line between the fax machine and the telephone. In recent years, many modems have a NCU function. The power source 508 supplies power to the image processing apparatus 500.

<Cadence Pattern>

Next, with reference to FIG. 2, a cadence pattern of a dial tone at the time of sending a fax will be described. There are broadly speaking two kinds of cadence standards for the dial tone. One is a continuous dial tone in which an ON state continues incessantly with no repetition of ON/OFF and the other is an intermittent dial tone having a certain repetition of ON/OFF. In the case of the continuous dial tone, detection is affirmed if the ON-time continues for at least a certain period of time. In the case of the intermittent dial tone, it is determined whether the lengths of ON-time and OFF-time are within respective specified ranges or not, and detection is ordinarily affirmed if a repetition of valid ON/OFF continues at least a certain number of times.

Figure 2:
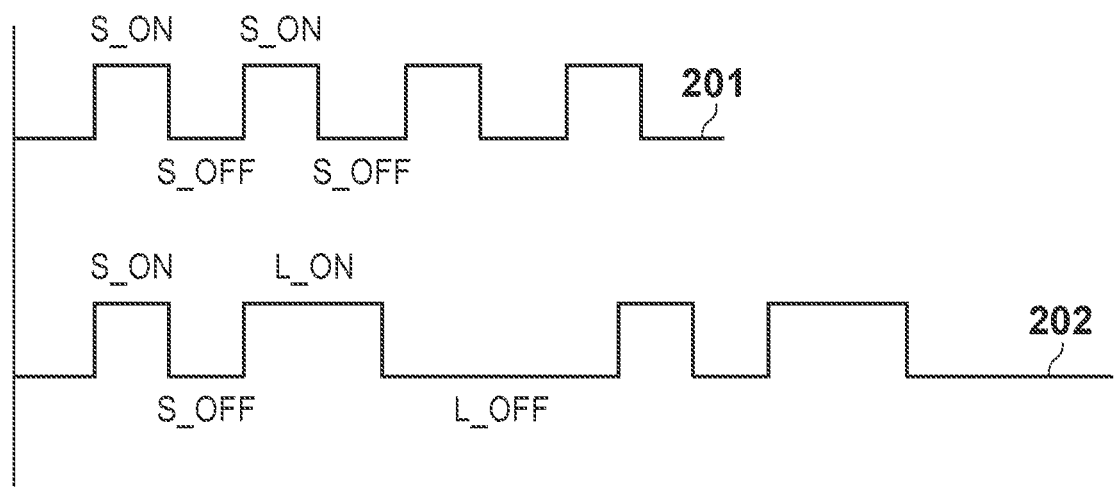
FIG. 2 is a diagram showing a cadence pattern of an intermittent dial tone in accordance with the present embodiment.

Cadence standards for the intermittent dial tone can be broadly classified into the two specific patterns shown in FIG. 2. S and L in FIG. 2 denote the length of a tone, "S (SHORT)" denoting a short tone and "L (LONG)" denoting a long tone. "M (MID, MIDDLE)" (not shown in FIG. 2) denotes a middle length tone between the lengths of S and L.

A first cadence pattern of the two specific patterns is a repetitive cadence pattern of SHORT_ON-SHORT_OFF as indicated by numeral 201 of FIG. 2. For example, the repetitive cadence pattern has 0.2 seconds of ON-time and 0.2 seconds of OFF-time. The second cadence pattern is a repetitive cadence pattern of SHORT_ON-SHORT_OFF-LONG_ON-LONG_OFF as shown in 202 of FIG. 2. For example, the repetitive cadence pattern has 0.2 seconds of ON-time, 0.2 seconds of OFF-time, 0.6 seconds of ON-time, and 1.0 seconds of OFF-time.

Such cadence patterns are held for each country. When receiving a dial tone and determining which country it belongs to, it takes more time to do processing, as the number of held cadence patters increases. Accordingly, it is desirable that the number of cadence patterns held is as small as possible. When a relatively small number of cadence patterns is held, it is possible to detect any received dial tone to some extent, by expanding the upper and lower limit values of ON-time and OFF-time. However, if the valid range of ON-time and OFF-time is expanded, then, when receiving a sound, there is an increased risk of misdetecting the sound as the dial tone. Sounds are ordinarily discontinuous, so that most misdetections occur by misdetecting the sound as the intermittent dial tone. The image processing apparatus according to the present embodiment holds only a relatively small number of cadence patterns of the dial tone, and reduces misdetections of the dial tone.

Specifically, using these features of the above-noted two cadence patterns, additional check conditions are set for detecting the intermittent dial tone. First, to classify ON-time and OFF-time into S, M, and L, thresholds (divisions) of the length of S (first division), M (second division), and L (third division) are set for the ON-time and the OFF-time. Then, when a valid length of a dial tone ON or OFF is detected, it is determined which of S, M, and L the length belongs to and information thereon is stored.

Next, when a valid length of ON or OFF is detected, it is checked whether the current pattern is consistent with an S, M, and L pattern of ON and OFF in the preceding cycle. If, as a result, it is found to be inconsistent with the above-noted two cadence patterns, it is determined that there is no dial tone and the previous verification results (equivalent to a detection count given below) are reset.

Figure 3:
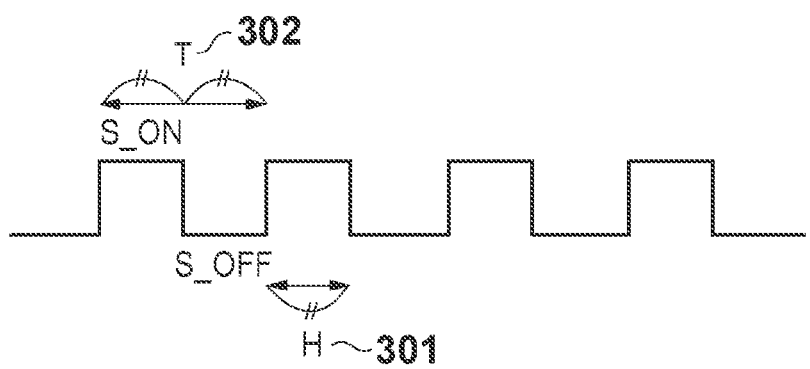
FIG. 3 is a diagram showing a duty cycle of an intermittent dial tone in accordance with the present embodiment.
Figure 5:
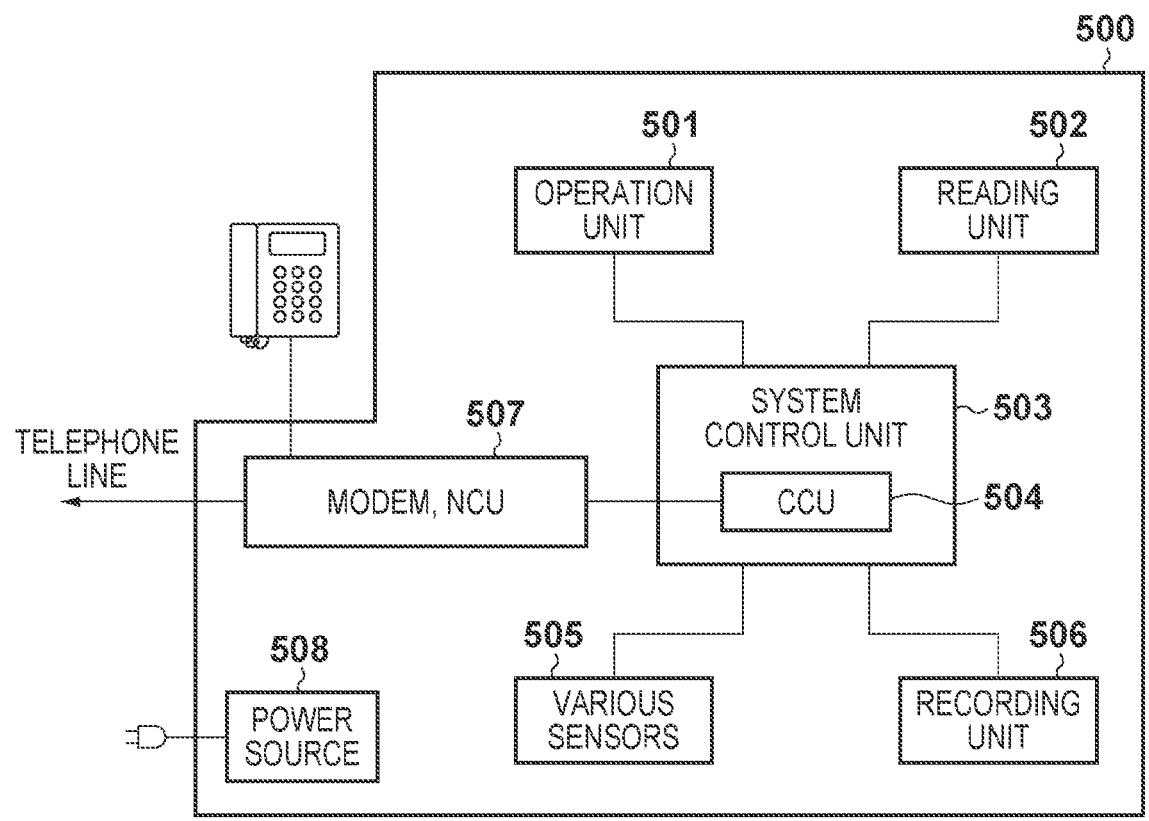
FIG. 5 is a diagram showing an example of the configuration of an image processing apparatus in accordance with the present embodiment.

Furthermore, in the first repetitive pattern 201 of SHORT_ON-SHORT_OFF, the ON-time and OFF-time are the same, so that the duty cycle should be 50% as shown in FIG. 3. Here, with reference to FIG. 3, the duty cycle of the dial tone will be described. Numeral 301 denotes a time interval during which a pulse signal is high (H). Numeral 302 denotes one period (T) of the pulse signal of the dial tone. Accordingly, the duty cycle can be represented by H/T×100(%). That is to say, the duty cycle indicates the ratio for which the dial tone is ON during one period of the pulse signal in the dial tone.

When a continuous SHORT_ON-SHORT_OFF pattern is detected, the image processing apparatus 500 according to the present embodiment makes an additional check of the duty cycle, utilizing the fact that the duty cycle is 50% as described above. Furthermore, when an error of the duty cycle is outside a given range, the previous verification results are reset. That is to say, the image processing apparatus 500 according to the present embodiment checks the length of the tone signal (S/M/L) and the duty cycle. Thereby, in the present embodiment, the number of held cadence patterns of the dial tone can be reduced and misdetections in which the sound is misdetected as the dial tone can be decreased.

<Determination of Dial Tone>

Hereinafter, the determination control of the dial tone in the present embodiment will be described. When receiving a dial tone, the image processing apparatus 500 of the present embodiment checks whether the cadence pattern and the duty cycle each satisfy regularities described below or not. First, seven regularities are described that are used to check the consistency of the cadence pattern with the S (SHORT), M (MID), and L (LONG) pattern of ON and OFF in the preceding period and to check the duty cycle.

<Check of Consistency with the Pattern in the Preceding Period>

Regularities 1 to 5 used to check consistency in the cadence patterns are given below.

Regularity 1: When receiving LONG_ON, the immediately preceding ON is SHORT and the immediately preceding OFF is also SHORT.

Regularity 2: When receiving LONG_OFF, the immediately preceding OFF is SHORT and the immediately preceding ON is LONG.

Regularity 3: When receiving SHORT_OFF, the immediately preceding ON is SHORT.

Regularity 4: MID_ON is absent.

Regularity 5: MID_OFF is absent.

The above-noted regularities 1 to 5 are conditions to determine with which of the two cadence patterns there is a match.

<Duty Cycle Check>

Regularities 6 to 7 given below are used to check the duty cycle.

Regularity 6: When SHORT_ON-SHORT_OFF continues, the ratio of ON-time to "immediately preceding ON-time+immediately preceding OFF-time" is within a specified range.

Regularity 7: When SHORT_ON-SHORT_OFF continues, the ratio of OFF-time to "immediately preceding ON-time+immediately preceding OFF-time" is within a specified range. The regularities 6 to 7 are conditions to determine the duty cycle of which of the two cadence patterns is resembled. It should be noted that with reference to FIG. 1, a method using the seven regularities 1 to 7 is described below.

<Table>

Next, with reference to FIGS. 4A to 4C, a table held by the image processing apparatus 500 will be described. As shown in FIG. 4A, the image processing apparatus 500 defines upper limit and lower limit values of ON-time and OFF-time country by country and holds them in the form of a table. That is to say, each pattern table shown in FIG. 4A shows the upper limit and lower limit values of ON-time and OFF-time country by country.

Furthermore, as shown in FIG. 4B, thresholds for SHORT, MID, and LONG are held as fixed values. The thresholds may also be listed in a table country by country, but in the present embodiment it is assumed that one definition is given per apparatus. The lengths (thresholds) of SHORT, MID, and LONG of ON-time and OFF-time are shown below. The thresholds given below are an example and there is no limitation thereto. The unit is s (second).

SHORT_ON (first division): lower limit value of ON to 0.325 s (first value)

MID_ON (second division): 0.325 s to 0.480 s (second value)

LONG_ON (third division): 0.480 s to upper limit value of ON

SHORT_OFF (first division): lower limit value of OFF to 0.360 s

MID_OFF (second division): 0.360 s to 0.640 s

LONG_ON (third division): 0.640 s to upper limit value of OFF

Here, the lower limit value/the upper limit value of ON and the lower limit value/the upper limit value of OFF correspond to the lower limit values/the upper limit values in the tables for a plurality of countries in FIG. 4A. That is, in the present embodiment, the dial tone is detected not by using the lower limit value/the upper limit value corresponding to that of each country, but the dial tone is detected by using the lower limit value/upper limit value corresponding to that of any country. Thereby, the processing amount to detect the dial tone is reduced. However, this approach increases the number of misdetections in which the sound is misdetected as the dial tone, as described above. Accordingly, the image processing apparatus 500 according to the present embodiment further holds the table in FIG. 4C.

The table shown in FIG. 4C defines thresholds for an upper limit value and a lower limit value of the duty cycle. The image processing apparatus 500 according to the present embodiment checks whether the duty cycle is within a range defined in FIG. 4C or not. In the present embodiment, the lower limit value/the upper limit value of the duty cycle are 0.3 and 0.7, respectively. It should be noted that the lower limit value/the upper limit value of the duty cycle correspond to the duty cycles of the above-noted two cadence patterns. However, the thresholds are an example and there is no limitation thereto.

<Processing Flow>

Next, a procedure of determination processing for a dial tone based on the regularities 1 to 7 is described with reference to FIG. 1. The overall control of the processing described below is performed by the system control unit 503. At S100, when receiving a signal from outside, the system control unit 503 determines its frequency, thereby determining which of a dial tone ON, noise, and no sound (dial tone OFF) the received signal is and calculates the duration time of the signal. That is to say, the system control unit 503 functions as a signal determination unit and a measurement unit at S100. When the dial tone is detected to be ON, the procedure goes to S112; when the dial tone is detected to be OFF, the procedure goes to S115; and when noise is detected, the procedure goes to S111.

When the dial tone is detected to be ON, the system control unit 503 determines at S112 whether the duration time calculated at S100 is at least a specified continuous ON-time (threshold). If it is at least the specified continuous ON-time, the procedure goes to S113 and the system control unit 503 affirms detection of a continuous dial tone and terminates the processing.

On the other hand, if the continuous ON-time is less than the specified value, the procedure goes to S114 and the system control unit 503 determines whether the received signal is within the range between MIN_ON and MAX_ON defined in the table of FIG. 4A. If it is outside this range, the signal is regarded as an invalid ON and the procedure goes to S111, and the system control unit 503 resets the previous verification. And if it is within this range, the procedure goes to S101 and the system control unit 503 determines which of the S, M, and L defined in the table of FIG. 4B the received signal is. If it is S, the procedure goes to S106; if it is M, the procedure goes to S111; and if it is L, the procedure goes to S102.

If it is LONG_ON, the system control unit 503 determines at S102 whether or not there is a match with the conditions of the regularity 1. That is to say, the system control unit 503 determines whether the dial tone pattern including the previously received tone signal and the currently received tone signal matches the regularity 1 or not. If there is no match, the cadence pattern is determined to be invalid and the procedure goes to S111 to reset the detection count. Here, the detection count is the number of times that a valid dial tone has been detected and if this count value exceeds a specified value, the procedure proceeds to a calling operation.

On the other hand, if there is a match, the procedure goes to S108. In addition, if MID_ON is determined at S101, then this violates the regularity 4, so that the procedure goes to S111 and the system control unit 503 resets the detection count. If SHORT_ON is determined at S101, the system control unit 503 determines at S106 whether the immediately preceding ON/OFF was SHORT or not. If it was SHORT, the procedure goes to S107, where it is determined whether the received signal is not greater than the upper limit value of the duty cycle defined in the table FIG. 4C, that is, whether it matches the conditions of the regularity 6. If there is a match, the procedure goes to S108. Furthermore, if it is determined at S106 that the immediately preceding ON/OFF was not SHORT, the procedure goes to S108. Furthermore, if there is no match with the regularity 6 at S107, the procedure goes to S111 and the system control unit 503 resets the detection count.

If the dial tone is detected to be OFF at S100, the system control unit 503 determines at S115 whether the received signal is within a range of MIN_OFF and MAX_OFF defined in the table of FIG. 4A. If it is outside this range, the signal is determined to be an invalid OFF and the procedure goes to S111, and the system control 503 resets the previous verification. On the other hand, if it is within this range, the procedure goes to S103 and the system control unit 503 determines which of S, M, and L defined in the table of FIG. 4B the received signal is. If it is S, the procedure goes to S104; if it is M, the procedure goes to S111; and if it is L, the procedure goes to S105.

If it is LONG_OFF, the system control unit 503 determines at S105 whether or not there is a match with the conditions of the regularity 2. If there is no match, the cadence pattern is determined to be invalid and the procedure goes to S111, where the detection count is reset. On the other hand, if there is a match, the procedure goes to S108. In addition, if MID_OFF is determined at S103, then this violates the regularity 5, so that the procedure goes to S111 and the detection count is reset. If SHORT_OFF is determined at S103, the system control unit 503 determines at S104 whether or not the conditions of the regularity 3 are matched and if there is no match, the procedure goes to S111 and the detection count is reset. If the conditions of the regularity 3 are matched, the procedure goes to S106 and the system control unit 503 determines whether the immediately preceding ON/OFF was SHORT or not. If it was SHORT, the procedure goes to S107 and then, it is determined whether the received signal is not greater than the upper limit value of the duty cycle as defined in the table FIG. 4C, that is, whether the conditions of the regularity 6 are matched. If there is a match, the procedure goes to S108. If it is determined at S106 that the immediately preceding ON/OFF was not SHORT, the procedure goes to S108. Furthermore, if the regularity 6 is not matched at S107, the procedure goes to S111 and the system control unit 503 resets the detection count.

Only when none of regularities 1 to 7 are violated, the system control unit 503 increments the detection count at S108. Then, the system control unit 503 determines at S109 whether the detection count exceeds a specified number of counts (given number of times) or not. If the detection count exceeds the specified number of counts, the procedure goes to S110 and the system control unit 503 affirms detection of the dial tone and performs a calling operation. On the other hand, if the detection count does not exceed the specified number of counts, the system control unit 503 returns the procedure to S100. It should be noted that the determinations at S102, S104, S105 and S106 correspond to processing of a pattern determination unit. In addition, the determination at S107 corresponds to processing of a duty cycle determination unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106624 filed on May 11, 2011, which is hereby incorporated by reference herein in its entirety.

What is claimed is:

1. An image processing apparatus comprising:
a signal determination unit that determines whether a received signal received from outside is a tone signal;
a measurement unit that measures a length of the tone signal, if the signal determination unit determines that the received signal is a tone signal;
a pattern determination unit that determines whether an intermittent dial tone has a specific pattern or not, the intermittent dial tone including the tone signal whose length is measured by the measurement unit and a previously received tone signal;
a duty cycle determination unit that determines whether a duty cycle of the intermittent dial tone is a duty cycle within a given range, if the pattern determination unit determines that the intermittent dial tone has the specific pattern; and
a calling unit that performs calling in accordance with the intermittent dial tone, if the duty cycle determination unit determines that the duty cycle of the intermittent dial tone is a duty cycle within the given range.

2. The image processing apparatus according to claim 1, wherein the signal determination unit determines whether the tone signal is ON or OFF, if the received signal is determined to be a tone signal.

3. The image processing apparatus according to claim 2, wherein the measurement unit assigns the length of the tone signal to a plurality of length divisions.

4. The image processing apparatus according to claim 3, wherein the plurality of length divisions are classified into a first division that ranges up to a first value from a lower limit value of a length of one tone signal out of a group of dial tone patterns that are each standardized for a plurality of countries; a second division that ranges from the first value to a second value that is larger than the first value; and a third division that ranges from the second value to an upper limit value of the length of one tone signal out of the group of dial tone patterns that are each standardized for a plurality of countries.

5. The image processing apparatus according to claim 4, wherein the specific pattern includes at least one repetitive pattern out of
a repetitive pattern of an ON tone signal having the length of the first division and an OFF tone signal having the length of the first division; and
a repetitive pattern of an ON tone signal having the length of the first division, an OFF tone signal having the length of the first division, an ON tone signal having the length of the third division, and an OFF tone signal having the length of the third division.

6. The image processing apparatus according to claim 1, wherein, if the number of times the duty cycle determination unit determines that the duty cycle of the intermittent dial tone is the duty cycle within a given range exceeds a given number of times, the calling unit performs calling in accordance with the intermittent dial tone.

7. The image processing apparatus according to claim 1, further comprising a decision unit that decides that the tone signal is a continuous dial tone, if the length of the tone signal measured by the measurement unit is at least a given threshold value.

8. A method for controlling an image processing apparatus comprising:
   determining, with a signal determination unit, whether a received signal received from outside is a tone signal;
   measuring, with a measurement unit, a length of the tone signal, if the received signal is determined in the signal determining step to be a tone signal;
   determining, with a pattern determination unit, whether an intermittent dial tone has a specific pattern, the intermittent dial tone including the tone signal whose length is measured in the measuring step and a previously received tone signal;
   determining, with a duty cycle determination unit, whether a duty cycle of the intermittent dial tone is a duty cycle within a given range, if the intermittent dial is determined in the pattern determining step to have the specific pattern; and
   calling in accordance with the intermittent dial tone with a calling unit, if the duty cycle of the intermittent dial tone is determined in the duty cycle determining step to be a duty cycle within the given range.

9. A non-transitory computer-readable storage medium storing a computer program that causes a computer to execute each step in the method for controlling an image processing apparatus according to claim 8.

\* \* \* \* \*